３,295,989
Patented Jan. 3, 1967

3,295,989
PRESERVATION OF UNBAKED BAKERY PRODUCTS WITH AN ANTIBIOTIC PEPTIDE AND THE RESULTING PRODUCT
Samuel A. Matz, Liverpool, Ernest George Linke, North Syracuse, and Donald E. Mook, De Witt, N.Y., assignors to The Borden Company, New York, N.Y., a corporation of New Jersey
No Drawing. Filed Oct. 24, 1963, Ser. No. 318,532
9 Claims. (Cl. 99—90)

This invention relates to packaged preleavened unbaked bakery products and to the method of making them, and, in particular, to canned chemically-leavened refrigerated doughs.

Refrigerated doughs for making such products as biscuits, pastry, rolls and related products are commonly offered for sale in cans having metal ends and sidewalls of fiber and foil composition. These cans are designed to withstand internal pressure developed by the leavening agents plus a safety factor which permits unavoidable processing variations in leavening strength and provides for additional pressure resulting from gas production by yeast and bacteria contaminants during storage. However, failure or rupture of the can body will ultimately occur after lengthy storage as the pressure resulting from gas production exceeds the strength of the can wall. Failure may be shown as an actual explosion of the can or it may be more gradual with a progressive breaking of the layers of the can body. In either case, total failure may be preceded by extrusion of a syrupy exudate from the interior onto the surface of the can. This exudate is also a result of bacterial action. Any of these phenomena make the can of dough unsalable.

In non-refrigerated packaged doughs, batters, puff-pastes and the like, the problem of microbial spoilage and deterioration of the product is even more aggravated.

It must be understood that in the manufacture of bakery products, even under the most stringent sanitary conditions, the result is a final unbaked product contaminated with microflora which are capable of multiplying even at refrigerated temperatures (40°–50° F.). In time these grow to numbers sufficient to bring about deterioration of the dough. Side reactions brought about by the microbial growth release gases, thereby leading to increased internal can pressure with subsequent exudation and can ruptures. Also, the microorganisms because of their enzymic activity cause deterioration of the quality of the product.

It has now been found that packaged preleavened unbaked bakery products can be prepared having a shelf life more than double that ordinarily obtained from present products.

Briefly stated, the present invention comprises packaged preleavened unbaked bakery products containing a small but effective amount of an antibiotic peptide to inhibit microbial growth and spoilage and the herein described process for making such products. The invention has particular reference to canned chemically leavened refrigerated dough products.

As used herein, the term "packaged unbaked bakery products" refers to chemically leavened refrigerated and non-refrigerated doughs, batters, and puff-pastes packaged in cans, boxes, plastic films and the like containers and used to make such products as biscuits, rolls, cinnamon or nut rolls, Danish pastry, coffee rings and the like bakery products.

As to materials, the flour, water, shortening, seasoning agents, leavening agents, and other ingredients employed in the bakery products and the proportions thereof are those conventionally used in making refrigerated and non-refrigerated unbaked bakery products that are to be stored and subsequently baked. Typical formulations are set forth in the examples herein, the Erekson et al. Patent No. 2,942,988 and the Matz text entitled "Bakery Technology and Engineering" (1960) published by the AVI Publishing Company, Inc. There is no criticality in the formulation of the unbaked bakery products as to the materials used, save for the antibiotic peptide.

The antibiotic peptide used is selected from the group consisting of nisin, subtilin, and mixtures thereof. As used herein the terms "nisin" and "subtilin" include the antibiotically active derivatives thereof such as certain of their salts. Of these, the nisin is preferred. The levels of peptide added varies dependent upon the microbial content of the product. Thus, doughs prepared under the most stringent conditions will require only about 30 units of nisin per gram of final bakery product to achieve the necessary storage life. This appears to be a minimum amount of nisin with the most commercially suitable amount which takes into account the average contamination of bakery products being about 100 units of nisin per gram of final unbaked product. Equivalent amounts of the subtilin are used.

The use of nisin and subtilin is advantageous in that these have no effect on the unbaked bakery products and do not alter any of the characteristics thereof, such as texture, taste, etc., after they have been baked.

The use of the antibiotic peptides and their effectiveness in the instant application is completely unexpected. Heretofore, for example, for nisin to operate properly as a preservative, heat had to be applied in order to render the spores and vegetative cells of the microorganisms sensitive to the action of nisin. It is therefore surprising and unexpected to find that nisin greatly inhibits the microbial growth and spoilage of unbaked bakery products, such as the canned refrigerated doughs, since these products receive no heat treatment prior to baking.

In accordance with the present invention the dough, batter, puff paste or like product is made in the conventional manner by admixing the ingredients, developing the product if needed, and shaping the product as desired. The antibiotic peptide is preferably added to the dry ingredients just prior to the addition of the water and thoroughly admixed to distribute it substantially uniformly through the product.

The dough is then placed in a container, allowed to proof if necessary, and then transported and sold in the normal channels of commerce. The purchaser need only open the container and bake the product.

The invention will be further illustrated by reference to the following examples of the practice of it which are given for purposes of illustration. In these examples the proportions are expressed as parts by weight on the dry basis (the flour is stated on the basis of a moisture content of 14%), unless otherwise stated.

*Example 1*

Two cereal doughs were made of the following formula:

| | Parts |
|---|---|
| Flour | 100 |
| Sucrose | 6.25 |
| Salt | 1.6 |
| Shortening | 6.25 |
| Non-fat milk solids | 6.25 |
| Sodium bicarbonate | 2.0 |
| Sodium acid pyrophosphate | 3.5 |
| Roll-in shortening | 30.0 |
| Water | 55.5 |

Both were made by admixing the dry ingredients in a standard mixing bowl used for dough development. The shortening was blended with the dry ingredients and then the water was added. The dough was mixed until thoroughly developed and the roll-in shortening incorporated into the dough in such a manner as to give a dough with a laminar structure composed of alternate layers of dough and shortening. The dough was sheeted out to about ½ inch thickness, dusted with rice powder and cut into hexagonal pieces. The pieces were placed in cans made to handle preleavened doughs, allowed to proof, and stored.

Batch 1 was stored at 70°–75° F. with no treatment whatever. Batch 2 was identical to Batch 1 except that the antibiotic nisin was added to the dry ingredients just prior to the addition of water at a level of 100 units per gram of final product. A total of 40 cans per batch was stored at 70°–75° F. All 40 cans of the untreated batch exploded between the third and fifth week of storage. All 40 cans of dough treated with nisin remained perfectly intact over a full 8-week storage period. There was no exudate on the outside of the cans, and there were no points of rupture on the cans themselves. The cans used were those conventionally employed for unbaked refrigerated products having metal ends and sidewalls of fiber and foil laminated construction.

*Example 2*

Two cereal doughs were made of the following formula:

| | Parts |
|---|---|
| Flour | 100 |
| Cerelose | 3.75 |
| Salt | 3.5 |
| Shortening | 12.5 |
| Non-fat milk solids | 4.0 |
| Sodium bicarbonate | 2.0 |
| Sodium acid pyrophosphae | 1.0 |
| Fumaric acid | 3.5 |
| Water | 61.0 |

Both were made using the same procedure as described in Example 1, except that no roll-in shortening was used and no laminar structure formed.

Batches 1 and 2 were identical, except that Batch 2 contained 100 units of nisin per gram of final product. Both batches were stored at 55° F. All five cans of Batch 1 exploded by the fourth week of storage. The 5 cans of Batch 2 were intact after 8 weeks storage, with only a few places on some of the cans showing incipient rupture.

*Example 3*

Three doughs were made with the same formula and using the same procedure as that described for Batch 2 in Example 2, except that the amount of nisin per gram of final product was varied. Batches 1, 2, and 3, contained 60, 30, and 10 units, respectively, of nisin per gram of final product. The incidence of can explosions and can fatigue generally increased as the level of nisin was decreased with Batch 3 being just slightly better in performance than Batch 1 of Example 2.

*Example 4*

Doughs are made using the same formula and procedure as set forth in Example 2, except that subtilin is substituted for the nisin used in Batch 2. The results as set forth in Example 2, with the subtilin containing doughs having at least double the shelf life of the untreated doughs.

If desired the shelf life of the products can be increased even more and microbial growth further inhibited by using combinations of nisin and benzoic acid. As shelf life is increased another limiting factor becomes the enzymic and non-enzymic chemical reactions occurring in these products due to the flour, leavening agent, etc., many of which result in a reduction of product quality.

It will be understood that it is intended to cover all changes and modifications of the examples of the invention herein chosen for the purpose of illustration which do not constitute departures from the spirit and scope of the invention.

What is claimed is:

1. A packaged unheated and unbaked bakery product selected from the group consisting of doughs, batters and puffed paste having dispersed substantially uniformly therethrough an effective amount of an antibiotic peptide selected from the group consisting of nisin, subtilin, and mixtures thereof to inhibit microbial growth and spoilage.

2. A packaged unheated and unbaked bakery product selected from the group consisting of doughs, batters and puff pastes having dispersed substantially uniformly therethrough an effective amount of an antibiotic peptide selected from the group consisting of nisin, subtilin, and mixtures thereof to inhibit microbial growth and spoilage.

3. A canned unheated and unbaked bakery product selected from the group consisting of doughs, batters and puffed paste having dispersed substantially uniformly therethrough at least about 30 units of an antibiotic peptide selected from the group consisting of nisin, subtilin, and mixtures thereof for each gram of product.

4. A canned unheated and unbaked refrigerated bakery product selected from the group consisting of doughs, batters and puffed pastes having dispersed substantially uniformly therethrough at least about 30 units of nisin for each gram of product.

5. The method of preserving a packaged unheated and unbaked bakery product selected from the group consisting of doughs, batters and puff pastes comprising dispersed substantially uniformly therethrough the product an effective amount of an antibiotic peptide selected from the group consisting of nisin, subtilin, and mixtures thereof to inhibit microbial growth and spoilage.

6. The method of preserving a packaged unheated and unbaked bakery product selected from the group consisting of doughs, batters and puff pastes which comprises dispersing substantially uniformly through the product at least about 30 units of nisin for each gram of product.

7. The method of preserving a packaged unheated and unbaked cereal dough product which comprises dispersing substantially uniformly through the dough an effective amount of nisin to inhibit microbial growth and spoilage.

8. The method of preserving a canned unheated and unbaked refrigerated bakery product selected from the group consisting of doughs, batters and puff pastes which comprises dispersing substantially uniformly through the product at least about 30 units of nisin for each gram of product prior to refrigerated storage of the product.

9. The method of preserving a canned cereal unheated dough for refrigerated storage and subsequent baking which comprises dispersing substantially uniformly through the product at least about 30 units of nisin for each gram of product.

References Cited by the Examiner

UNITED STATES PATENTS

| 2,379,294 | 6/1945 | Gooding | 99—224 |
| 2,550,267 | 4/1951 | Jensen et al. | 99—92 X |
| 2,858,225 | 10/1958 | Gooding et al. | 99—171.5 |

FOREIGN PATENTS

| 734,520 | 8/1955 | Great Britain. |

OTHER REFERENCES

Kaufmann et al., "Food Research," September–October 1954, pp. 483–484.

Tarr et al., "Food Technology," September 1952, pp. 363–366, article entitled "Experimental Preservation of Flesh Food With Antibiotics."

A. LOUIS MONACELL, *Primary Examiner.*

RAYMOND N. JONES, *Examiner.*